(12) United States Patent
Casteilla et al.

(10) Patent No.: US 10,486,230 B2
(45) Date of Patent: Nov. 26, 2019

(54) METHOD FOR MANUFACTURING A TWO-COMPONENT BLADE FOR A GAS TURBINE ENGINE AND BLADE OBTAINED BY SUCH A METHOD

(71) Applicant: SAFRAN AIRCRAFT ENGINES, Paris (FR)

(72) Inventors: Francois Casteilla, Moissy-cramayel (FR); Sebastien Digard Brou De Cuissart, Moissy-cramayel (FR); Serge Alain Fargeas, Moissy-cramayel (FR); Vincent Marc Herb, Moissy-cramayel (FR); Chantal Sylvette Marie-Noël Langlois, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 184 days.

(21) Appl. No.: 15/323,766

(22) PCT Filed: Jun. 29, 2015

(86) PCT No.: PCT/FR2015/051747
§ 371 (c)(1),
(2) Date: Jan. 4, 2017

(87) PCT Pub. No.: WO2016/001544
PCT Pub. Date: Jan. 7, 2016

(65) Prior Publication Data
US 2017/0136534 A1 May 18, 2017

(30) Foreign Application Priority Data

Jul. 4, 2014 (FR) ..................................... 14 56426

(51) Int. Cl.
*B22C 9/24* (2006.01)
*B22D 19/00* (2006.01)
(Continued)

(52) U.S. Cl.
CPC ................ *B22D 25/02* (2013.01); *B22C 1/00* (2013.01); *B22C 9/108* (2013.01); *B22C 9/24* (2013.01);
(Continued)

(58) Field of Classification Search
CPC .. B22C 9/24; B22C 9/10; B22C 9/108; B22D 19/00; B22D 19/04; B22D 25/02; F01D 5/28; F01D 5/284
See application file for complete search history.

(56) References Cited

U.S. PATENT DOCUMENTS 3,662,816 A * 5/1972 Bishop ..................... B22C 9/04
164/366
3,844,728 A 10/1974 Copley et al.
(Continued)

FOREIGN PATENT DOCUMENTS

DE 28 34 843 A1 6/1980
EP 0 118 020 A1 9/1984
(Continued)

OTHER PUBLICATIONS

International Search Report dated Oct. 7, 2015 in PCT/FR15/051747 Filed Jun. 29, 2015.

*Primary Examiner* — Kevin E Yoon
(74) *Attorney, Agent, or Firm* — Oblon, McClelland, Maier & Neustadt, L.L.P.

(57) ABSTRACT

A method of fabricating a two-component blade for a gas turbine engine, the method including in succession: obtaining a blade profile made of ceramic material having a hole passing right through the blade profile in its length direction so as to form a longitudinal channel opening out into a top cavity; positioning and maintaining the blade profile in a mold so as to form a bottom cavity communicating with the channel of the blade profile; casting molten metal into the blade profile so as to fill the top and bottom cavities and the (Continued)

channel interconnecting them; and cooling the metal so that the shrinkage of the metal cooled in the top and bottom cavities leads to the ceramic of the blade profile being subjected to compression prestress.

7 Claims, 2 Drawing Sheets

(51) Int. Cl.

| | |
|---|---|
| *B22D 19/04* | (2006.01) |
| *B22D 25/02* | (2006.01) |
| *B22C 1/00* | (2006.01) |
| *B22C 9/10* | (2006.01) |
| *B22D 21/00* | (2006.01) |
| *B22D 29/00* | (2006.01) |
| *B22D 30/00* | (2006.01) |
| *F01D 5/14* | (2006.01) |
| *F01D 5/18* | (2006.01) |

(52) U.S. Cl.
CPC ......... *B22D 21/005* (2013.01); *B22D 29/001* (2013.01); *B22D 30/00* (2013.01); *F01D 5/147* (2013.01); *F01D 5/18* (2013.01); *F05D 2220/32* (2013.01); *F05D 2230/211* (2013.01); *F05D 2300/177* (2013.01); *F05D 2300/211* (2013.01)

(56) References Cited

U.S. PATENT DOCUMENTS

| | | | |
|---|---|---|---|
| 4,247,259 A | | 1/1981 | Saboe et al. |
| 4,375,233 A | | 3/1983 | Rossmann et al. |
| 4,376,004 A | * | 3/1983 | Bratton .................. F01D 5/184 156/89.27 |
| 4,519,745 A | * | 5/1985 | Rosman .................. F01D 5/284 416/241 B |
| 4,563,128 A | | 1/1986 | Rossmann |
| 4,790,721 A | * | 12/1988 | Morris .................... F01D 5/187 416/241 B |
| 2012/0163979 A1 | | 6/2012 | Darkins, Jr. et al. |

FOREIGN PATENT DOCUMENTS

| | | | | |
|---|---|---|---|---|
| EP | 2 468 434 A1 | | 6/2012 | |
| FR | 2 463 849 A1 | | 2/1981 | |
| FR | 2463849 A1 | * | 2/1981 | ............... F01D 5/18 |
| GB | 2027496 A | * | 2/1980 | ............... F01D 5/20 |
| GB | 2 062 530 A | | 5/1981 | |

\* cited by examiner

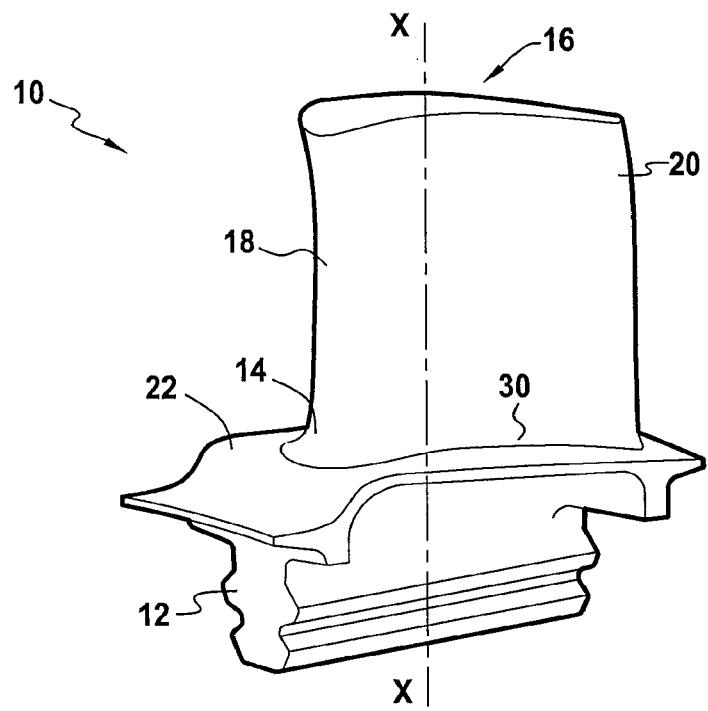
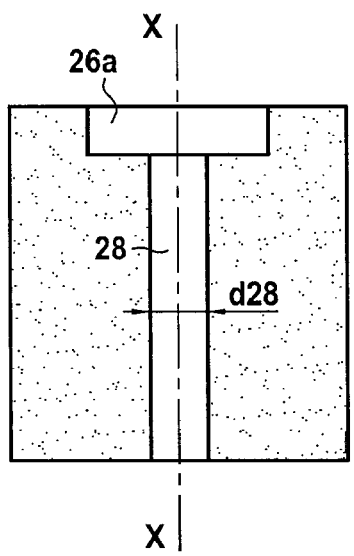
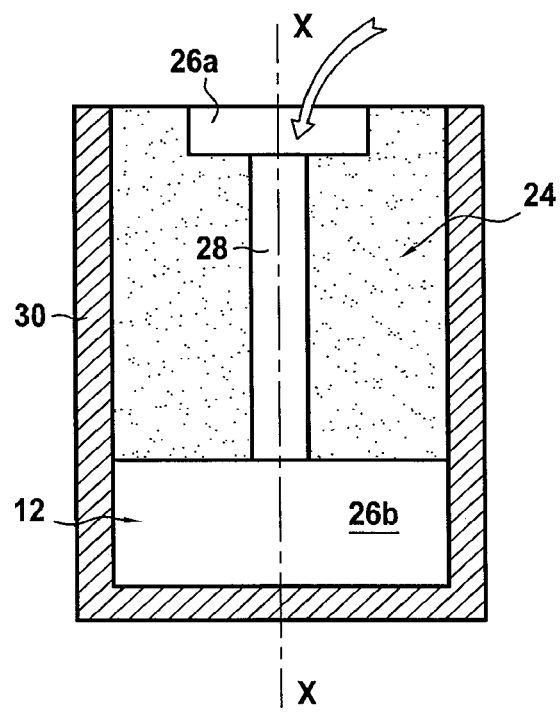

METHOD FOR MANUFACTURING A TWO-COMPONENT BLADE FOR A GAS TURBINE ENGINE AND BLADE OBTAINED BY SUCH A METHOD

BACKGROUND OF THE INVENTION

The present invention relates to the general field of fabricating blades for gas turbine engines.

Gas turbine engine blades, and in particular the high pressure turbine blades of a turbojet, are subjected to hot gas coming from a combustion chamber.

In order to improve the efficiency of the engine, it is known to increase the temperature of such ejection gas from the combustion chamber up to temperatures that can be considerably higher than the melting points of the best metal alloys from which blades are generally fabricated.

Thus, in order to enable metal alloy blades to withstand very high temperatures, it is known to cover them in a ceramic coating constituting a thermal barrier and to provide internal cooling circuits.

Nevertheless, such coatings and such internal cooling circuits are becoming more and more complex to provide and they do not always enable blades to withstand the very high temperatures of ejection gas from a combustion chamber. In particular, the trend is for the temperature of such ejection gas to be raised above the present-day temperatures of combustion chamber ejection gas, thereby making it more complex to provide thermal barrier-forming coatings and internal cooling circuits.

OBJECT AND SUMMARY OF THE INVENTION

There thus exists a need to be able to have a method of fabricating a blade that enables it to withstand very high temperatures without presenting the above-mentioned drawbacks.

In accordance with the invention, this object is achieved by a method of fabricating a two-component blade for a gas turbine engine, the method comprising in succession:

obtaining a blade profile made of ceramic material having a hole passing right through the blade profile in its length direction so as to form a longitudinal channel opening out at a first longitudinal end of the blade profile into a top cavity;

positioning and maintaining the blade profile in a mold so as to form a bottom cavity communicating with the channel of the blade profile at a second longitudinal end of the blade profile;

casting molten metal into the blade profile so as to fill the top and bottom cavities and the channel interconnecting them; and cooling the metal so that the shrinkage of the metal cooled in the top and bottom cavities leads to the ceramic of the blade profile being subjected to compression prestress.

The fabrication method of the invention is remarkable in that during cooling of the metal cast in the cavities of the blade profile, the natural shrinkage of the metal exerts a compression force on the ceramic constituting the blade profile (in the length direction of the blade profile). The blade obtained by this fabrication method thus presents compression prestress in the ceramic. In operation, the force to which the blade is subjected is centrifugal force (in the length direction of the blade profile), which gives rise to a traction force on the components of the blade. With its compression prestress and because of the difference of expansion between the ceramic and the metal that constitutes it, the blade can thus easily withstand the traction forces to which it is subjected. In particular, in order to eliminate this compression prestress, it is necessary to reach temperatures at which the metal no longer has any mechanical strength, and such temperatures are never reached in practice in a gas turbine engine.

Furthermore, subjecting the ceramic constituting the blade profile of the blade obtained by the fabrication method of the invention to compression makes it possible to select the ceramic from a wide range of ceramics, in particular from ceramics that are less expensive than those commonly used. The weight of the blade obtained in this way is also less than the weight of prior art blades. Finally, such a blade is easily repairable, merely by replacing ceramic.

Preferably, the ceramic material used for forming the blade profile is alumina and the metal used for casting is a nickel-based metal alloy.

Also, preferably, the method further includes making an internal cooling circuit in the blade. Under such circumstances, an internal cooling circuit may be made in the blade by acting, prior to the step of casting molten metal, to place at least one elongate core in the channel extending right through the blade profile in its length direction, and, after the step of casting molten metal, to extract the core in order to form an air passage passing right through the blade. The core for making the internal cooling circuit in the blade may be made of silica.

Such a cooling circuit is easy to make, in particular compared with the internal cooling circuits of blades known in the prior art. In addition, the cooling circuit presents little impact on the performance of the engine.

The invention also provides a gas turbine engine blade obtained by the method as defined above.

The invention also provides a gas turbine engine including at least one such blade.

BRIEF DESCRIPTION OF THE DRAWINGS

Other characteristics and advantages of the present invention appear from the following description given with reference to the accompanying drawings, which show embodiments having no limiting character. In the figures:

FIG. 1 is a diagrammatic perspective view of a blade obtained by the fabrication method of the invention;

FIGS. 2 to 5 are diagrammatic views showing various steps of the method of fabricating the FIG. 1 blade.

DETAILED DESCRIPTION OF THE INVENTION

Figure 4:
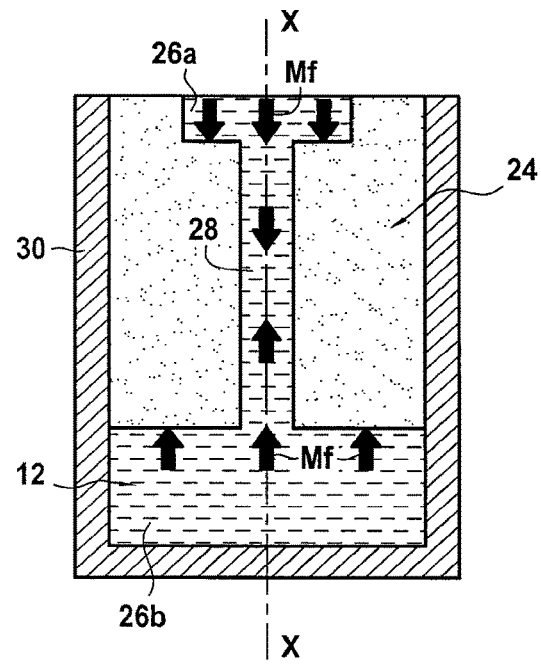

The invention applies to making any blade for use in a gas turbine engine, and in particular to blades for the high pressure turbine of a turbojet, such as the blade 10 shown in FIG. 1.

In known manner, the blade 10 has a longitudinal axis X-X and is for fastening to a rotor disk of the high pressure turbine of the turbojet by engaging a generally Christmas-tree-shaped root 12 in a slot.

The blade 10 extends along the longitudinal axis X-X from a foot 14 to a tip 16 and has a leading edge 18 and a trailing edge 20. The root 12 connects with the foot 14 of the blade via a platform 22 defining an inside wall for the flow passage for the combustion gas passing through the high pressure turbine.

Such a blade 10 needs to withstand the very high temperatures of the gas coming from the combustion chamber of the turbojet situated immediately upstream from the high pressure turbine.

In accordance with the invention, there is provided a method of fabricating such a blade that enables this object to be achieved.

For this purpose, the method of the invention provides initially making a blade profile out of ceramic material. The term "blade profile" is used to mean a part having the final shape of the blade.

This blade profile may be obtained using various known methods that are not described in detail herein, e.g. by a method involving injecting ceramic into a mold of appropriate shape, or by a fabrication method that is said to be "additive" (i.e. using three-dimensional printing).

Another known technique that could be used (and that is adapted to mass production of blades) is the lost wax casting technique using a shell mold and having recourse to preparation by directed solidification. Reference may be made to Document EP 2 092 999 in which such a method is described.

When the method used for obtaining the blade profile involves injecting ceramic into a mold of appropriate shape, the blade profile is subsequently pierced (e.g. with a mechanical tool) so as to make a hole passing right through the blade profile in its length direction, i.e. along the longitudinal axis X-X of the blade that is to be fabricated.

This through hole is made so as to form a top cavity 26a at a top longitudinal end of the blade profile, this top cavity opening out into a channel 28. The channel 28 presents a diameter d28 that is smaller in size than the top cavity 26a into which it leads.

As shown in FIG. 3, the blade profile 24 is positioned and held in place in a mold 30 so as to arrange a bottom cavity 26b that communicates with the channel 28 of the blade profile at the bottom longitudinal end of the blade profile. In the same manner as the top cavity, the bottom cavity 26b presents a right section that is greater in size than the diameter d28 of the channel 28.

Naturally, when the method used for obtaining the blade profile involves other fabrication techniques, in particular such as lost wax casting using a shell mold, the channel and the top and bottom cavities of the blade profile are obtained by other means (typically by cores).

The following step of the method of the invention consists in casting molten metal into the blade profile 24 so as to fill both cavities 26a and 26b and the channel 28 interconnecting them.

This casting operation is typically performed in a casting oven (not shown in the figures) in which the mold 30 is placed. The molten metal Mf is poured into the mold 30 through the blade profile 24 from the top cavity 26a so as to completely fill the bottom cavity 26b, the channel 28, and the top cavity 26a. By way of example, the metal selected for casting may be a nickel-based metal alloy, such as AM1 as is typically used by the manufacturer Snecma for making some of its monocrystalline turbine blades.

Once casting the molten metal is finished, the mold 30 is extracted from the casting oven and the blade profile 24 is cooled. This cooling has the natural consequence of the metal shrinking inside the cavities 26a, 26b, and inside the channel 28 interconnecting them (this shrinkage is represented by arrows in FIG. 4).

Figure 5:
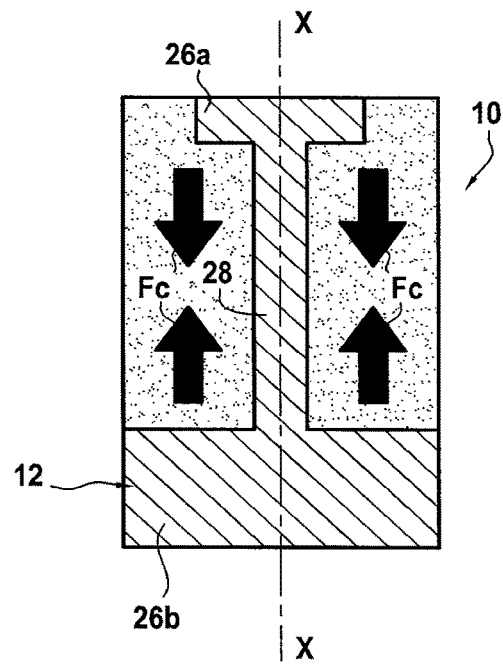

Thus, and as shown in FIG. 5, a two-component blade 10 is obtained with its top cavity 26a filled with metal situated beside the tip 16 of the blade and its bottom cavity 26b defining at least part of the root 12 of the blade.

The shrinkage of the metal cooled in the cavities and the channel interconnecting them leads to the ceramic of the blade profile being subjected to compression prestress (which compression prestress is represented by arrows Fc).

In operation, the blade is subjected not only to high temperatures, but also to centrifugal force (in the length direction of the blade profile, going from the root to the tip), which centrifugal force gives rise to a traction force on the blade profile. With its compression prestress, the blade can thus easily withstand the traction forces to which it is subjected. In particular, the difference in expansion between the ceramic constituting the blade profile and the metal cast in the cavities and the channel therein has the effect in operation of decreasing the compression prestress on the ceramic of the blade profile.

Figure 6:
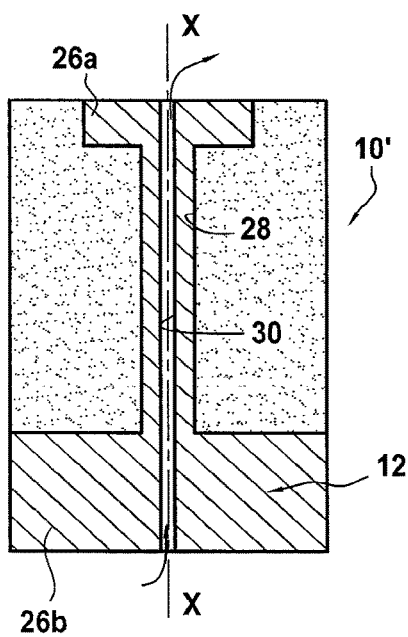
FIGS. 6 and 7 are longitudinal section views of blades constituting various embodiments of the invention.

FIG. 6 shows a variant embodiment of a blade 10' obtained by the method of the invention.

In this variant, provision is made for an internal cooling circuit in the blade. For this purpose, prior to the step of casting molten metal into the blade profile, an elongate core (not shown) is arranged in the channel 28 interconnecting the cavities 26a and 26b, which core may be made out of silica suitable for knocking out, for example. This core thus passes right through the blade profile in its length direction.

After the step of casting molten metal, the core is extracted from the blade profile by knocking out so as to form an air passage 30 passing right through the blade 10'. A stream of cooling air is injected into the air passage 30 from the base of the root 12 of the blade and it is discharged into the high pressure turbine passage at the tip 16 of the blade.

Figure 7:
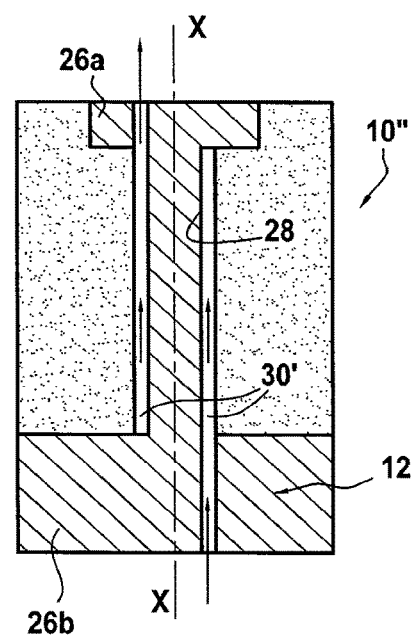

FIG. 7 shows another variant embodiment of a blade 10" obtained by the method of the invention.

In this other variant, the blade 10" also has an internal cooling circuit. When the method used for obtaining the blade profile involves injecting ceramic into a mold of appropriate shape, this circuit is formed by positioning a core in the form of a bushing in the channel 28 either prior to the step of casting molten metal into the blade profile or when putting the blade profile in the casting mold. When the method used for obtaining the blade profile involves lost wax casting with a shell mold, the cooling circuit is formed prior to the step of injecting the wax by positioning a core of shape corresponding to the internal cooling circuit into the wax injection mold.

After the step of casting molten metal, the bushing-shaped core is extracted from the blade profile so as to form an air passage 30' that is annular in the central portion of the blade 10". A stream of cooling air is injected into this air passage 30' from the base of the root 12 of the blade and it is discharged into the passage of the high pressure turbine via the tip 16 of the blade.

The invention claimed is:

1. A method of fabricating a two-component blade for a gas turbine engine, the method comprising in succession:
    obtaining a blade profile made of ceramic material, the blade profile including a top cavity at a first longitudinal end thereof which is delimited by internal side walls extending inward from the first longitudinal end of the blade profile and a shoulder, and a hole passing right through the blade profile in a length direction thereof between the shoulder and a second longitudinal end of the blade profile so as to form a longitudinal channel opening out from the top cavity, a distance between the internal walls in section being greater than a diameter of the longitudinal profile;

positioning and maintaining the blade profile in a mold so as to form a bottom cavity communicating with the longitudinal channel of the blade profile at the second longitudinal end of the blade profile, the bottom cavity being delimited by side walls of the mold, a bottom wall of the mold, and the second longitudinal end of the blade profile, an entire width of the bottom cavity being equal to an entire width of the blade profile;

casting molten metal into the blade profile so as to fill the top and bottom cavities and the longitudinal channel interconnecting the top and bottom cavities, the bottom cavity being completely filled with molten metal such that all of the second longitudinal end of the blade profile is in direct contact with the molten metal in the bottom cavity; and cooling the metal so that shrinkage of the metal cooled in the top and bottom cavities leads to the ceramic of the blade profile being subjected to compression prestress.

2. The method according to claim 1, wherein the ceramic material used for forming the blade profile is alumina and the metal used for casting is a nickel-based metal alloy.

3. The method according to claim 1, further comprising making an internal cooling circuit in the blade.

4. The method according to claim 3, wherein the internal cooling circuit is made in the blade by, prior to the step of casting molten metal, placing an elongate core in the longitudinal channel, and, after the step of casting molten metal, extracting the elongate core in order to form an air passage passing right through the blade.

5. The method according to claim 4, wherein the elongate core for making the internal cooling circuit in the blade is made of silica.

6. The method according to claim 1, wherein the molten metal directly contacts an internal wall of the blade profile delimiting the longitudinal channel during the step of casting molten metal.

7. The method according to claim 1, wherein the metal cooled in the bottom cavity defines at least part of a root of the blade.

\* \* \* \* \*